United States Patent [19]

Fukuda

[11] Patent Number: 5,170,873
[45] Date of Patent: Dec. 15, 1992

[54] CLUTCH COVER ASSEMBLY FOR TWIN CLUTCH

[75] Inventor: Yoshinobu Fukuda, Neyagawa, Japan

[73] Assignee: Kabushibu Kaisha Daikin Seisakusho, Osaka, Japan

[21] Appl. No.: 768,206

[22] PCT Filed: Feb. 18, 1991

[86] PCT No.: PCT/JP91/00197
§ 371 Date: Oct. 23, 1991
§ 102(e) Date: Oct. 23, 1991

[87] PCT Pub. No.: WO91/13265
PCT Pub. Date: Sep. 5, 1991

[30] Foreign Application Priority Data
Mar. 1, 1990 [JP] Japan ............... 2-20749[U]

[51] Int. Cl.$^5$ .............................. F16D 13/54
[52] U.S. Cl. .................. 192/70.25; 192/70.11; 192/111 B
[58] Field of Search ............... 192/70.11, 70.25, 111 B

[56] References Cited

U.S. PATENT DOCUMENTS

| | | | |
|---|---|---|---|
| 4,601,373 | 7/1986 | Després et al. | 192/70.25 |
| 4,640,399 | 2/1987 | Börjesson | 192/70.25 |
| 4,715,484 | 12/1987 | Flotow | 192/70.25 |
| 4,742,901 | 5/1988 | Takeuchi et al. | 192/70.25 |
| 4,848,554 | 7/1989 | Fukuda | 192/70.25 |
| 4,848,555 | 7/1989 | Riese et al. | 192/70.25 |
| 4,958,714 | 9/1990 | Cooke et al. | 192/70.25 |
| 5,018,613 | 5/1991 | Nagano | 192/70.25 |
| 5,090,537 | 2/1992 | Fukuda | 197/70.25 |

Primary Examiner—Leslie A. Braun
Assistant Examiner—Andrea Pitts
Attorney, Agent, or Firm—Armstrong & Kubovcik

[57] ABSTRACT

In a twin clutch, a positioning member 23 and a reverse movement obstruction member 21 are installed on an outer periphery of an intermediate plate 11. Projections 32 extend from the positioning member 23 and elastic lingual pieces 29 extend from a reverse movement obstruction member 21 respectively. A movement of the positioning member 23 to a pressure plate 5 side relative to the reverse movement obstruction member 21 is obstructed by an engagement of the elastic lingual pieces 29 with the projections 32. A movement of the positioning member 23 relative to the reverse movement obstruction member 21 is allowed only to the flywheel 5 side. Therefore, a force can be minimized which is required to move the positioning member 23 to the flywheel 5 side according to a wear of the first clutch disc 15, and a load reduction under a clutch engaged state can be decreased preferably.

2 Claims, 3 Drawing Sheets

CLUTCH COVER ASSEMBLY FOR TWIN CLUTCH

TECHNICAL FIELD

This invention relates to a clutch cover assembly for twin clutch having two clutch discs with an intermediate plate sandwiched between a pressure plate and a flywheel.

BACKGROUND ART

In general twin clutches, it is required to maintain a clearance of larger than specified value in between a pressure plate and an intermediate plate under clutch disengaged condition. Further, even in case when a clutch disc is worn out, it is required to sufficiently intensely press two clutch discs against a flywheel by the pressure plate with the intermediate plate sandwiched between them under clutch engaged condition.

For this reason, a conventional twin clutch has a construction, in which plural projections 52, FIG. 8, extending outwardly in radial directions are formed at an outer periphery of an intermediate plate 51 with proper spaces left in circumferential direction, axial passing holes 53 are made on the projections 52 so as to allow positioning members 54 to slidably fit in the passing hole 53. A flywheel ring 57 couples a flywheel 55 to a clutch cover 56. A body 57a of the flywheel ring 57 is spaced from one end of the positioning member 54 by a specified clearance δ. A force required to slide the positioning member 54 is set larger than an urging force of an elastic strap (not shown) urging the intermediate plate 51 to the clutch cover 56 side, and set smaller than a pressing force for engagement of clutch applied from a releasing unit (not shown) through a diaphragm spring etc. to the pressure plate 58. By this arrangement, the positioning member 54 is designed to contact with the body 57a of the flywheel ring 57 so as to limit a movement of the intermediate plate 51 toward the clutch cover 56 during clutch disengagement operation, and the intermediate plate 51 can be spaced from the pressure plate 58 by a proper clearance under the clutch disengaged condition. In case when a clutch disc 60 is worn out, the other end of the positioning member 54 is designed to contact with the flywheel 55 so as not to limit a movement of the intermediate plate 51 toward the flywheel 55 during clutch engagement operation. The positioning member 54 slides through the passing hole 53, and the clutch discs 59 and 60 are intensely pressed against the flywheel 55 by the pressure plate 58 with the intermediate plate 51 sandwiched between the discs. The state shown in FIG. 8 shows the clutch engaged condition, and in which the clutch discs 59 and 60 are pressed against the flywheel 55 by the pressure plate 58 with the intermediate plate 51 sandwiched between the clutch discs.

In the above conventional construction, a sliding load of the positioning member 54 has been active in a direction opposite to a pressing load of the pressure plate 54 under the clutch engaged condition, so as to cause the pressing load to be reduced. This load reduction has tended to become large with an elapse of time so as to be a cause of affecting a clutch performance. It has been required to improve machining accuracies of elements because of a precise load balance required, so that a manufacturing cost has been raised.

DISCLOSURE OF INVENTION

In order to solve the above problem, the present invention relates to a clutch cover assembly for twin clutch which comprises a flywheel assembly composed of a flywheel and a clutch cover fastened thereto, a pressure plate connected to the flywheel assembly in a slidable but not rotatable manner through a first elastic strap to be located between the clutch cover and the flywheel, an intermediate plate connected to the flywheel assembly in a slidable but not rotatable manner through a second elastic strap to be located between the pressure plate and the flywheel, a first clutch disc located between the pressure plate and the intermediate plate, and a second clutch disc located between the intermediate plate and the flywheel; characterized by that a positioning member movable in its axial direction by a specified distance and engageable at its tip end with an outer periphery of the pressure plate and a reverse movement obstruction member facing the positioning member with a specified distance left between them, are installed on an outer periphery of the intermediate plate, plural projections are formed on the positioning member, lingual pieces are elastically formed on the reverse movement obstruction member, the lingual piece being projected toward the positioning member to engage at its tip end with the projection while getting near to the flywheel from its base to the tip end, the lingual piece engages with the projection to prevent the positioning member from moving to the pressure plate side relative to the reverse movement obstruction member, and the movement of the positioning member relative to the reverse movement obstruction member is allowed only to the flywheel side.

In this invention, when the positioning member is operated to move to the pressure plate side relative to the reverse movement obstruction member, this movement is obstructed by the engagement of the lingual piece with the projection. When the positioning member is operated to move to the flywheel side relative to the reverse movement obstruction member, the lingual piece is elastically deformed to release the engagement with the projection so that this movement is operable.

BEST MODE FOR CARRYING OUT THE INVENTION

One embodiment of the present invention will be described with reference to FIG. 1 to FIG. 7.

Figure 2:
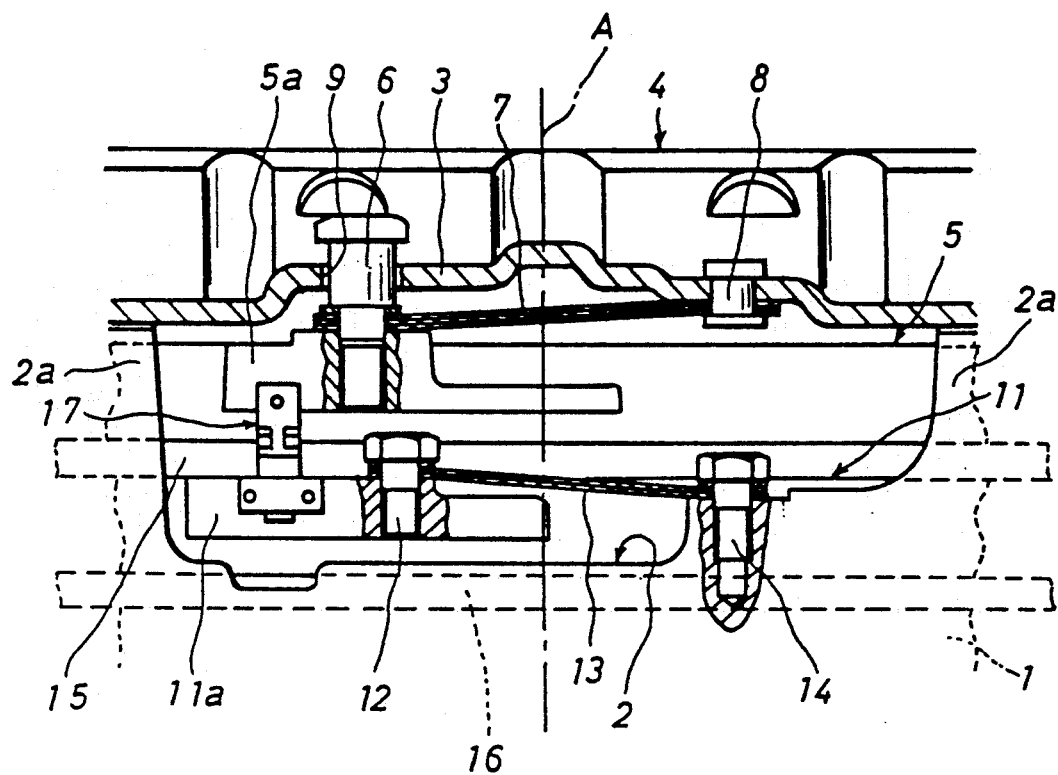
FIG. 2 is a substantial plan view of the clutch cover assembly.

FIG. 2 is the substantial plan view showing the clutch cover assembly according to one embodiment of the invention, in which a disc-like flywheel 1 has a ring 2 on its outer periphery, and plural projections 2a extending in axial direction are formed integrally on the ring 2 with specified spaces left between them in circumferential direction. The flywheel 1 is coupled to an engine crank shaft (not shown) and rotates about an axis A. The projections 2a have tip ends connected to a clutch cover 3, and a flywheel assembly 4 is composed of the flywheel 1, the ring 2 and the clutch cover 3.

An annular disc-like pressure plate 5 is disposed between the clutch cover 3 and the flywheel 1 in coaxial relation to the flywheel 1, and plural projections 5a extending outwardly in radial directions are formed integrally on an outer periphery of the pressure plate 5 with specified spaces left therebetween in the circumferential direction. One end of a first elastic strap 7 is secured to the projection 5a by a bolt 6, and the other end of the first elastic strap 7 is secured to the clutch cover 3 by a rivet 8. The first elastic strap 7 is active to urge the pressure plate 5 to the clutch cover 3 side. The bolt 6 extends through an opening 9 of the clutch cover 3.

An annular disc-like intermediate plate 11 is disposed between the pressure plate 5 and the flywheel 1 in coaxial relation to the flywheel 1, and plural projections 11a extending outwardly in radial directions are formed integrally on an outer periphery of the intermediate plate 11 with specified spaces left between them in the circumferential direction. One end of a second elastic strap 13 is secured to the projection 11a by a bolt 12, and the other end of the second elastic strap 13 is secured to the ring 2 by a bolt 14. The second elastic strap 13 is active to urge the intermediate plate 11 to the flywheel 1 side.

An annular disc-like first clutch disc 15 is disposed between the pressure plate 5 and the intermediate plate 11 movably in the axial direction, and an annular disc-like second clutch disc 16 is disposed between the intermediate plate 11 and the flywheel 1 movably in the axial direction. A positioning unit 17 is disposed between the projections 5a of the pressure plate 5 and the projections 11a of the intermediate plate 11 in order to secure a proper clearance between the pressure plate 5 and the intermediate plate 11 when the clutch is disengaged. Although not shown in the figure, the first and second clutch discs 15 and 16 engage at their inner peripheries with an output shaft in circumferential direction through a damper unit etc. for example, and friction facings are secured to both side faces of the first and second clutch discs 15 and 16 respectively.

Figure 3:
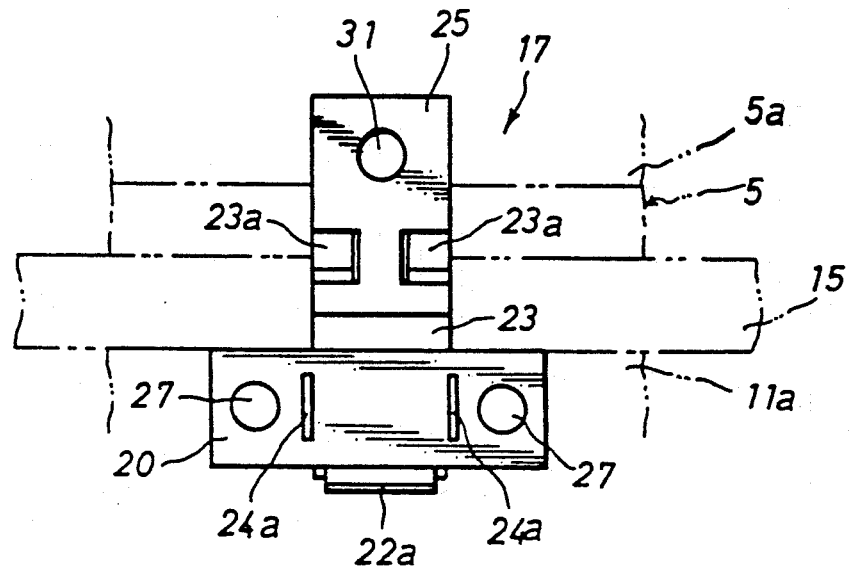
FIG. 3 is a plan view showing an essential part of the clutch cover assembly.
Figure 4:
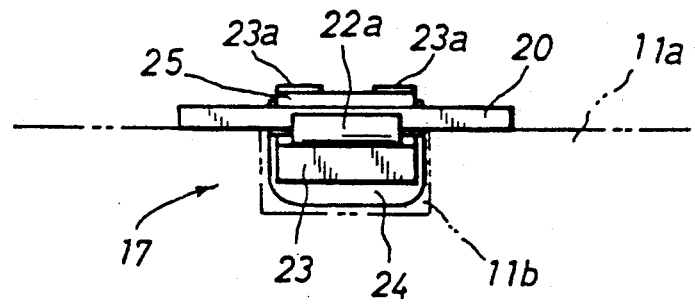
FIG. 4 is a front view of the same.
Figure 5:
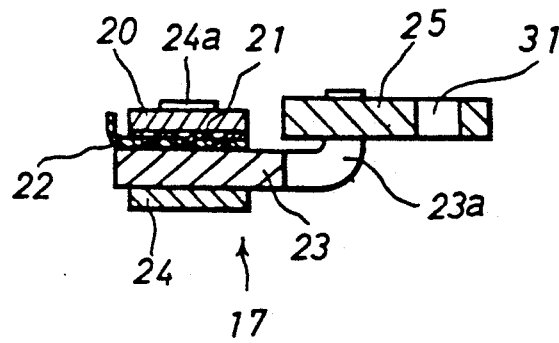
FIG. 5 is a vertical sectional view of the same.
Figure 6:
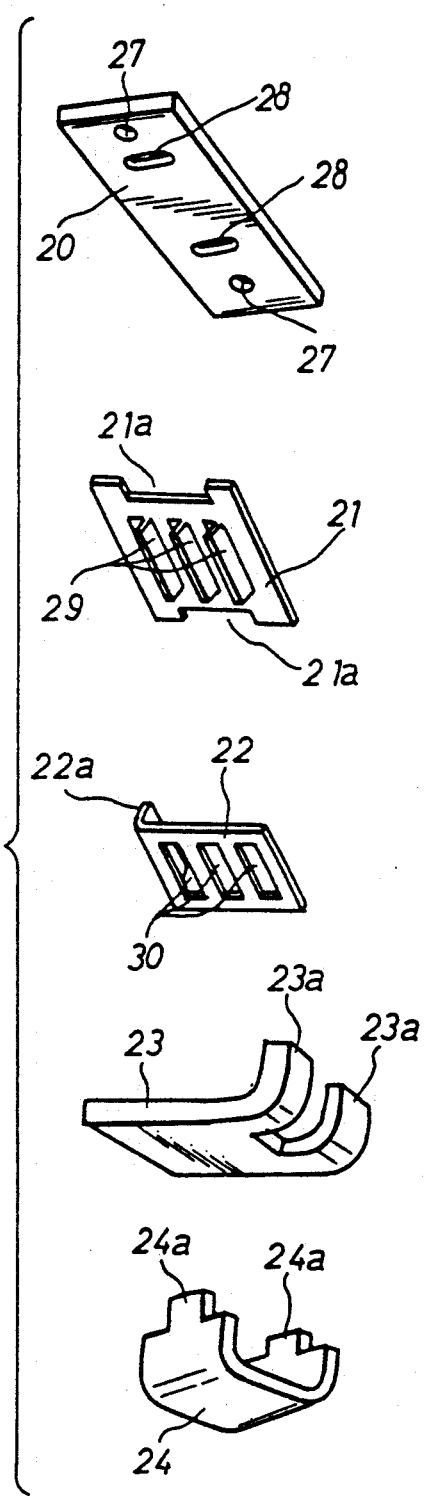
FIG. 6 is a perspective view of the same.
Figure 7:
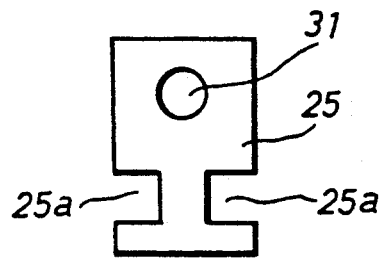
FIG. 7 is a plan view of an engagement member.

FIG. 3 is the plan view showing the positioning unit 17, FIG. 4 is the front view of the same, FIG. 5 is the vertical sectional view of the same, and FIG. 6 is the perspective exploded view of the same. The positioning unit 17 is composed of an attaching plate 20, a reverse movement obstruction member 21, an engagement releasing member 22, a positioning member 23, a support member 24 and an engagement member 25 of FIG. 7. The attaching plate 20 is of a flat-plate type, and has a pair of bolt holes 27 and a pair of elongate holes 28 at its both ends in a direction perpendicular to a clutch axial direction (axis A direction). The attaching plate 20 is secured to the projections 11a of the intermediate plate 11 by bolts (not shown) extending through the bolt holes 27. The reverse movement obstruction member 21 consists of a flat spring material, and has plural lingual pieces 29 integrally cut upright in the direction perpendicular to the clutch axial direction. Recesses 21a are formed on the reverse movement obstruction member 21 at its both ends in the direction perpendicular to the clutch axial direction, respectively. The engagement releasing member 22 is of a flat-plate type, and has plural openings 30 through which the lingual pieces 29 of the reverse movement obstruction member 21 pass. A flywheel 1 side end of it, between clutch axial both ends, is bent toward the attaching plate 20 to compose a bent portion 22a. The positioning member 23 is of a flat-plate type having a comparatively large wall thickness. A pair of hook-like bent portions 23a extend integrally toward the attaching plate 20 from one end face at the pressure plate 5 side between clutch axial both end faces. The support member 24 is formed into a sectional substantially U-shape, and the projections 24a extend integrally from both tip ends of the U-shape. The support member 24 extends in a recess 11b (FIG. 4) formed on the projection 11a of the intermediate plate 11. The projections 24a of the support member 24 fit in the recesses 21a of the reverse movement obstruction member 21 and extend through elongate holes 28 of the attaching plate 20. The engagement member 25 is of a flat-plate type, on which a bolt hole 31 and a pair of recesses 25a are formed. The engagement member 25 is secured to the projection 5a of the pressure plate 5 by a bolt (not shown) extending through the bolt hole 31. That is, the reverse movement obstruction member 21, the engagement releasing member 22 and the positioning member 23 are sandwiched between the attaching plate 20 and the support member 24. The attaching plate 20 is secured by welding to the support member 24 each other, and the reverse movement obstruction member 21 is secured by welding to the support member 24 each other. The bent portion 23a of the positioning member 23 fits at its tip end in the recess 25a of the engagement member 25.

Figure 1:
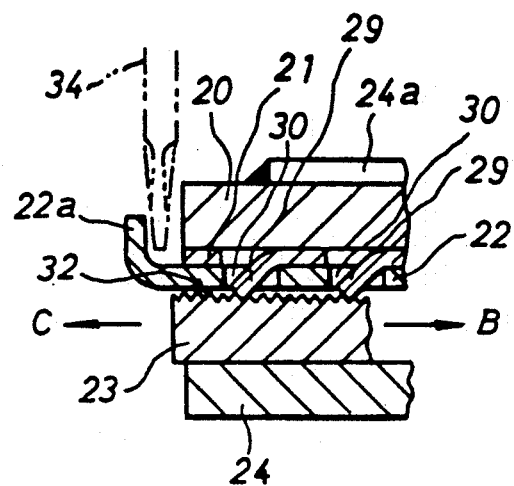
FIG. 1 is an enlarged sectional view showing an essential part of a clutch cover assembly for twin clutch in one embodiment of the present invention.

FIG. 1 is the enlarged sectional view showing the essential part of the positioning unit 17, in which many projections 32 are integrally formed on the attaching plate 20 side of the both surfaces of the positioning member 23. The projections 32 have triangular sections and formed by knurling along a line perpendicular to the clutch axial direction. The lingual piece 29 of the reverse movement obstruction member 21 extends to the positioning member 23 side while getting near to the flywheel 1 from its base to the tip, and finally engages with the projection 32.

Function will next be described. Now, the clutch is assumed to be in the disengaged state. Under this state, the intermediate plate 11 is urged to the flywheel 1 side by the second elastic strap 13, and the bent portion 23a of the positioning member 23 engages with the engagement member 25 so as to secure the specified clearance between the pressure plate 5 and the intermediate plate 11. When the clutch engagement operation is commenced to push the pressure plate 5 to the flywheel 1 side, the pressure plate 5 is moved together with the intermediate plate 11 to the flywheel 1 side while maintaining the specified clearance, and the intermediate plate 11 first presses the second clutch disc 16 lightly onto the flywheel 1 by an urging force of the second elastic strap plate 13. When the pressure plate 5 is further moved to the flywheel 1 side, the clutch disc 15 is pressed against the intermediate plate 11 by the pressure plate 5. The clutch engaged state is thus brought about, wherein the intermediate plate 11 together with the first and second clutch discs 15 and 16 are firmly sandwiched between the pressure plate 5 and the flywheel 1 as illustrated by FIG. 2.

When the clutch disengagement operation is commenced to push the pressure plate 5 to the clutch cover 3 side under the clutch engaged condition of FIG. 2, the intermediate plate 11 is being urged to the flywheel 1 side by the second elastic strap 13 so that the intermediate plate 11 does not move but the pressure plate 5 moves to the clutch cover 3 side. The first clutch disc 15 is then separated from the intermediate plate 11, and the pressure plate 5 is separated from the first clutch disc 15. When the pressure plate 5 is moved further to the clutch cover 3 side after the bent portion 23a of the positioning member 23 engages with the engagement member 25, the bent portion 23a of the positioning member 23 is pulled by the engagement member 25. The intermediate plate 11 is thereby moved integrally to the clutch cover 3 side against the urging force of the second elastic strap 13 while maintaining the specified clearance between it and the pressure plate 5. In this instance, the positioning member 23 is pulled in the direction of the arrow B of FIG. 1 (clutch cover 3 side). However, as seen from an inclining position of the lingual piece 29 of the reverse movement obstruction member 21, the lingual piece 29 is not released from the projection 32 of the positioning member 23 even when the force is applied to the positioning member 23 in the direction of the arrow B. Accordingly, the intermediate plate 11 moves integrally with the positioning member 23 in the direction of the arrow B. In this way, the second clutch disc 16 is separated from the flywheel 1 and the intermediate plate 11 is separated from the second clutch disc 16, so that the clutch disengaged state is brought about.

When the first clutch disc 15 is worn out, the bent portion 23a of the positioning member 23 is intensely pushed by the engagement member 25 to the flywheel 1 side during the clutch engaging operation, so that the positioning member 23 is moved to the flywheel 1 side by a distance corresponding to the wear amount of the clutch disc 15. Namely, the positioning member 23 is pushed in the direction of the arrow C of FIG. 1 (flywheel 1 side). However, as seen from the inclining position of the lingual piece 29 of the reverse movement obstruction member 21, the lingual piece 29 is pushed back by the projection 32 of the positioning member 23 to the reverse movement obstruction member 21 side and is elastically deformed so that the lingual piece 29 is released from the projection 32, when a force larger than the specified value is applied to the positioning member 23 in the direction of the arrow C. For this reason, the positioning member 23 can be moved in the direction of the arrow C. Accordingly, the intermediate plate 11 and the first and second clutch discs 15 and 16 can be sandwiched between the pressure plate 5 and the flywheel 1 even when the first clutch disc 15 is worn out. Under the clutch disengaged condition, the clearance between the pressure plate 5 and the intermediate plate 11 can always be maintained to a proper value because the engagement member 25 is engaged with the bent portion 23a of the positioning member 23. In order to replace the first clutch disc 15, a screwdriver 34 is to be inserted in a gap between the bent portion 22a of the engagement releasing member 22 and the attaching plate 20 as shown by two-dot chain lines of FIG. 1. The screwdriver 34 is then turned to move the engagement releasing member 22 to the arrow C side, so that the lingual piece 29 of the reverse movement obstruction member 21 is deformed to the reverse movement obstruction member 21 side by the engagement releasing member 22. The positioning member 23 can thereby be moved freely in the direction of the arrow B to allow a voluntary position setting.

The one-way movement of the positioning member 23 is thus accomplished by the ratchet system of the engagement between the projection 32 of the positioning member 23 and the lingual piece 29 of the reverse movement obstruction member 21. Therefore, a force can be minimized which is required to move the positioning member 23 in the direction of the arrow C according to the wear of the first clutch disc 15, and the load reduction under the clutch engaged state can be decreased preferably. The worsening of clutch performance caused by the increase in load reduction with an elapse of time can be preferably avoided. Further, since the precise load balance is not necessary and a high machining accuracy is not required as encountered in conventional clutches, the manufacturing cost can be reduced. Moreover, the operation is positively carried out and a high reliability can be achieved. The engagement releasing member 22 having the opening 30 through which the lingual piece 29 of the reverse movement obstruction member 21 passes, is used in the embodiment. When the engagement releasing member 22 is moved in the direction of the arrow C of FIG. 1, the positioning member 23 can thereby be moved freely in the direction of the arrow B to allow a new voluntary position setting.

Figure 8:
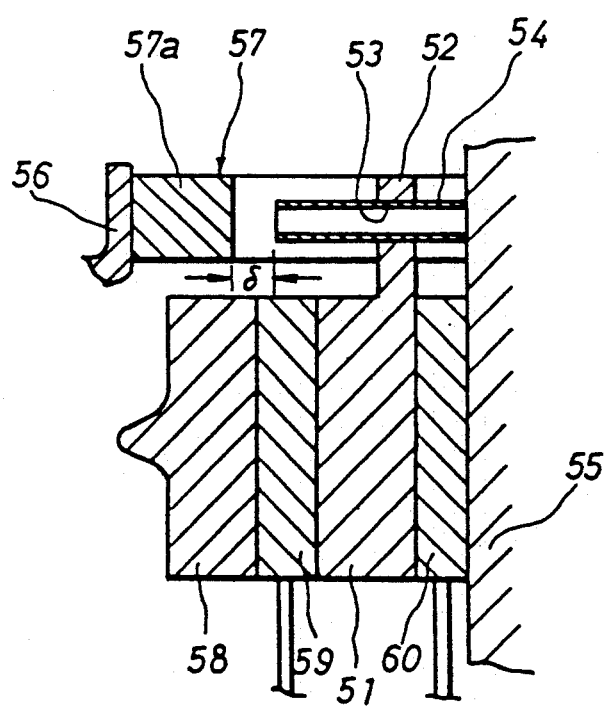
FIG. 8 is a sectional view showing an essential part of a conventional clutch cover assembly for twin clutch.

The intermediate plate 11 is urged to the flywheel 1 side by the second elastic strap 13, in this embodiment. A frequency of forced sliding is larger in the second clutch disc 16 than in the first clutch disc 15, so that wear amounts of the first clutch disc 15 and the second clutch disc 16 can be equalized and service lives of them can be elongated. Namely, when the frequency of forced sliding of the first clutch disc 15 at the pressure plate 5 side is substantially equal to that of the second clutch disc 16 at the flywheel 1 side, the first clutch disc 15 is worn more rapidly than the second clutch disc 16 in consideration of a heat-mass. In case when a frequency of forced sliding is larger in the first clutch disc 59 than in the second clutch disc 60 as shown by the conventional clutch of FIG. 8, a wear amount of the first clutch disc 59 becomes extremely large as compared with that of the second clutch disc 60. However, in case when the frequency of forced sliding is larger in the second clutch disc 16 than in the first clutch disc 15 as described in this embodiment, the wear amount of the first clutch disc 15 will become equal to that of the second clutch disc 16. Consequently, the service life of the first clutch disc 15 can be elongated without affecting the function of the conventional clutch, and a time and a man-power can be preferably saved by the reduction in exchange frequency of the first clutch disc 15.

The intermediate plate 11 is urged to the flywheel 1 side by the second elastic strap 13 in the embodiment, however, the present invention is not limited to this structure. An element which does not urge the intermediate plate 11 in any direction, may be used for the second elastic strap 13. Further, an element which urges the intermediate plate 11 lightly to the pressure plate 5 side, may be used for the second elastic strap 13.

As described above, according to the present invention; the positioning member movable in its axial direction by a specified distance and engageable at its tip end with the outer periphery of the pressure plate and the reverse movement obstruction member facing the positioning member with a specified distance left between them, are installed on the outer periphery of the intermediate plate, plural projections are formed on the positioning member, the lingual pieces are elastically formed on the reverse movement obstruction member, the lingual piece being projected toward the positioning member to engage at its tip end with the projection while getting near to the flywheel from its base to the tip end, the lingual piece engages with the projection to prevent the positioning member from moving to the pressure plate side relative to the reverse movement obstruction member, and the movement of the positioning member relative to the reverse movement obstruction member is allowed only to the flywheel side. Therefore, the one-way movement of the positioning member is thus accomplished by the ratchet system of the engagement between the projection of the positioning member and the lingual piece of the reverse movement obstruction member. Accordingly, the force can be minimized which is required to move the positioning member to the flywheel side according to the wear of the first clutch disc, and the load reduction under the clutch engaged state can be decreased preferably. The worsening of clutch performance caused by the increase in load reduction with an elapse of time can be preferably avoided. Further, since the precise load balance is not necessary and a high machining accuracy is not required as encountered in conventional clutches, the manufacturing cost can be reduced. Moreover, the operation is positively carried out and a high reliability can be achieved.

INDUSTRIAL APPLICABILITY

In a general twin clutch, the worsening of clutch performance caused by the increase in load reduction with an elapse of time can be preferably avoided.

What is claimed is:

1. A clutch cover assembly for twin clutch which comprises a flywheel assembly composed of a flywheel and a clutch cover fastened thereto, a pressure plate connected to the flywheel assembly in a slidable but rotatable manner through a first elastic strap located between the clutch cover and the flywheel, an intermediate plate connected to the flywheel assembly in a slidable but not rotatable manner through a second elastic strap located between the pressure plate and the flywheel, a first clutch disc located between the pressure plate and the intermediate plate, and a second clutch disc located between the intermediate plate and the flywheel; characterized by that a positioning member movable in its axial direction by a specified distance and engagable at its tip end with an outer periphery on the pressure plate and a reverse movement obstruction member facing the positioning member with a specified distance left between them, are positioned on an outer periphery of said intermediate plate, plural projections are formed on said positioning member, lingual pieces are elastically formed on said reverse movement obstruction member, each lingual piece of said lingual pieces being projected toward said positioning member to engage a tip end of said each lingual piece with one projection of said plural projections on said positioning member as said positioning member moves toward said pressure plate, said each lingual piece engages with said projection and prevents said positioning member from moving toward said pressure plate when movement of said obstruction member is reversed, and movement of said positioning member relative to said reverse movement obstruction member is allowed only toward said flywheel.

2. A clutch cover assembly for a twin clutch as set forth in claim 1, in which said second elastic strap urges said intermediate plate toward said flywheel.

* * * * *